(12) United States Patent
Song et al.

(10) Patent No.: US 8,874,745 B2
(45) Date of Patent: Oct. 28, 2014

(54) METHOD AND SYSTEM FOR PROVIDING SERVICES

(75) Inventors: Zhexuan Song, Sunnyvale, CA (US); Jesus Molina, San Francisco, CA (US); Ryusuke Masuoka, Potomac, MD (US)

(73) Assignee: Fujitsu Limited, Kawasaki-shi (JP)

( * ) Notice: Subject to any disclaimer, the term of this patent is extended or adjusted under 35 U.S.C. 154(b) by 952 days.

(21) Appl. No.: 12/748,054

(22) Filed: Mar. 26, 2010

(65) Prior Publication Data

US 2011/0238837 A1    Sep. 29, 2011

(51) Int. Cl.
*G06F 15/173* (2006.01)
*G06F 9/54* (2006.01)

(52) U.S. Cl.
CPC .................................... *G06F 9/54* (2013.01)
USPC ............ 709/226; 709/202; 709/217; 709/229

(58) Field of Classification Search
USPC ................. 709/223–229, 202–203, 217–219
See application file for complete search history.

(56) References Cited

U.S. PATENT DOCUMENTS

| 6,115,712 | A  | * | 9/2000 | Islam et al. ..................... 707/10 |
| 6,877,096 | B1 | * | 4/2005 | Chung et al. .................. 713/185 |
| 6,944,521 | B2 | * | 9/2005 | Yoshida et al. ............... 700/169 |
| 7,613,817 | B2 | * | 11/2009 | Eibach et al. ................. 709/231 |
| 7,873,692 | B2 | * | 1/2011 | Yamada et al. ............... 709/203 |
| 7,908,313 | B2 | * | 3/2011 | Lurie et al. ................... 709/203 |
| 7,996,818 | B1 | * | 8/2011 | Venugopal .................... 717/124 |
| 2002/0120685 | A1 | * | 8/2002 | Srivastava et al. ............ 709/226 |
| 2008/0307340 | A1 | * | 12/2008 | Kojima et al. ................ 715/764 |
| 2009/0132538 | A1 | * | 5/2009 | Kojima et al. .................... 707/9 |
| 2009/0157848 | A1 | * | 6/2009 | Khoo ............................ 709/219 |
| 2011/0126267 | A1 | * | 5/2011 | Sathish ......................... 709/226 |

* cited by examiner

*Primary Examiner* — Bharat N Barot
(74) *Attorney, Agent, or Firm* — Baker Botts L.L.P.

(57) ABSTRACT

Methods and systems for providing services and/or computing resources are provided. A method may include receiving an application from an application provider. The method may further include receiving data from a data provider. The method may also include receiving a first request from the data provider to execute the application and apply the data as input to the application. Additionally, the method may include executing the application in response to receiving the first request. The method may also include storing output data resulting from execution of the application. The method may further include receiving a second request from the data provider to transmit the output data to the data provider. The method may additionally include communicating the output data to the data provider in response to the second request.

17 Claims, 2 Drawing Sheets

METHOD AND SYSTEM FOR PROVIDING SERVICES

TECHNICAL FIELD

This disclosure relates in general to communication systems and more particularly to a method and system for providing computing resources to an application provider and a data provider.

BACKGROUND

Applications, also known as application programs, are computer-readable instructions configured to perform a singular or multiple related specific tasks. Typically, applications perform tasks based on data provided to the application, perform tasks that process and/or manipulate such provided data, and/or perform tasks that produce data.

Often, the entities or parties providing an application and the data to be applied to the application are two independent parties: the application provider which owns the application, and the data provider which owns the data. In some instances, both the application provider and the data provider will desire that their respective properties (the application and the data) secure and protected from other parties. For example, an application provider may have an advanced, proprietary algorithm, while a data provider may have confidential data. The application provider may not desire to provide the application to the data provided because of a risk that the data provider may abuse the application and/or reverse engineer the application. In addition, the data provider may not desire to provide data to the application provider for fear that the confidential data may be compromised by the application provider. In addition, the data provider may desire that the results of execution remain private and/or may desire that the data provider's identity not be revealed to the application provider.

SUMMARY OF THE DISCLOSURE

The present disclosure provides methods and systems for providing services and/or computing resources that substantially eliminates or reduces at least some of the disadvantages and problems associated with previous methods and systems.

A method may include receiving an application from an application provider. The method may further include receiving data from a data provider. The method may also include receiving a first request from the data provider to execute the application and apply the data as input to the application. Additionally, the method may include executing the application in response to receiving the first request. The method may also include storing output data resulting from execution of the application. The method may further include receiving a second request from the data provider to transmit the output data to the data provider. The method may additionally include communicating the output data to the data provider in response to the second request.

Technical advantages of certain embodiments of the present disclosure include allowing an application provider to provide an application with decreased risk of abuse and/or misuse of the application by a data provider, and allowing a data provider to apply data to the application with deceased risk of abuse and/or misuse of the data by an application provider.

Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
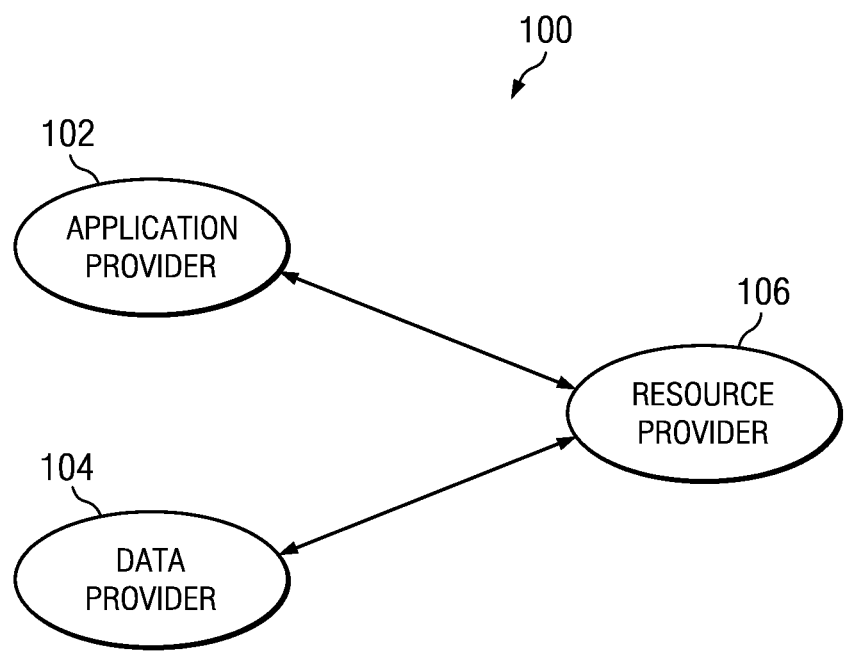
FIG. 1 illustrates a block diagram of an example service provision system, in accordance with certain embodiments of the present disclosure.

FIG. 1 illustrates a block diagram of an example service provision system 100, in accordance with certain embodiments of the present disclosure. According to the illustrated embodiment, service provision system 100 may include an application provider 102, a data provider 104, and a resource provider 106 in communication with each of the application provider 102 and data provider 104.

Application provider 102 may include any system, device, or apparatus configured to store one or more applications and/or upload such applications to resource provider 106 for execution. In some embodiments, application provider 102 may include a computer or similar device. Application provider 102 may include a user interface that allows a user and/or administrator to maintain and/or manage the one or more applications and/or the uploading of applications to resource provider 106.

Data provider 104 may include any system, device, or apparatus configured to store data and/or upload such data to resource provider 106 to be applied to execution of an application. In some embodiments, application provider 102 may include a computer or similar device. Data provider 104 may include a user interface that allows a user and/or administrator to maintain and/or manage the one or more applications and/or the uploading of applications to resource provider 106.

Resource provider 106 may include any system, device, or apparatus configured to execute applications uploaded by application provider 102, including executing applications based on data uploaded by data provider 104. In some embodiments, resource provider 106 may include a computer or similar device. Resource provider 106 may be in communication with application provider 102 and/or data provider 104 in any suitable manner. For example, in some embodiments provider 106 may be in communication with application provider 102 and/or data provider 104 via a communication network that may comprise all, or a portion of, a radio access network; a public switched telephone network (PSTN); a public or private data network; a local area network (LAN); a metropolitan area network (MAN); a wide area network (WAN); a local, regional, or global communication or computer network such as the Internet; a wireline or wireless network; an enterprise intranet; or any combination of the preceding. In certain embodiments, resource provider 106 may execute a web server such that users of application provider 102 and/or data provider 104 may interact with resource provider via an Internet browser.

Additional functionality and properties of each of application provider 102, data provider 104, and resource provider 106 are described in greater detail below.

Modifications, additions, or omissions may be made to system 100 without departing from the scope of the disclosure. The components and elements of system 100 described may be integrated or separated according to particular needs. Moreover, the operations of system 100 may be performed by more, fewer, or other components.

Figure 2:
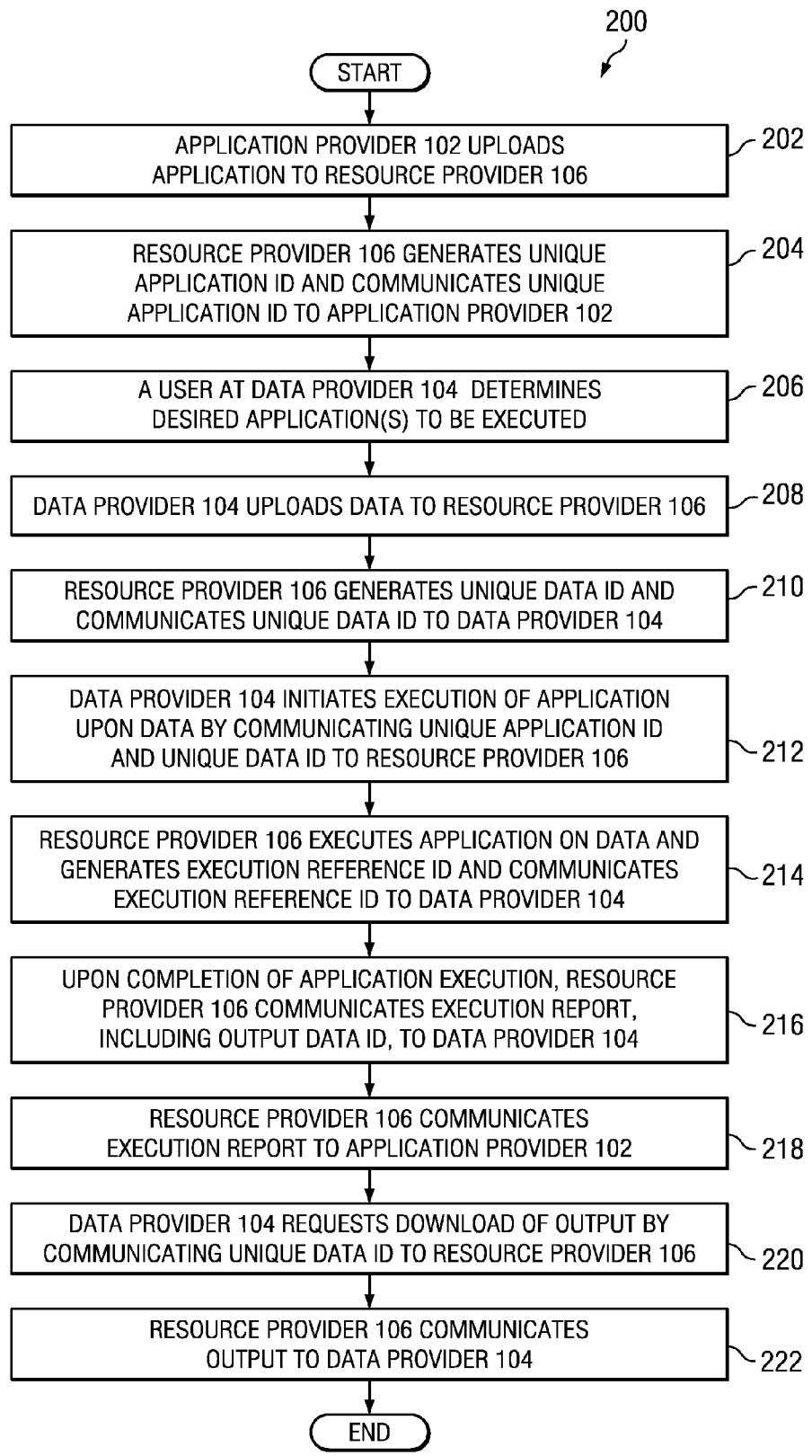
FIG. 2 illustrates a flow chart of an example method for providing services, in accordance with certain embodiments of the present disclosure.

FIG. 2 illustrates a flow chart of an example method 200 for providing services, in accordance with certain embodiments of the present disclosure. According to one embodiment, method 200 may begin at step 202. As noted above, teachings of the present disclosure may be implemented in a variety of configurations of system 100. As such, the preferred initialization point for method 200 and the order of the steps 202-222 comprising method 200 may depend on the implementation chosen.

At step 202, application provider 102 may upload an application to resource provider 106. Such uploading may be performed manually and/or automatically. For example, a user of application provider 102 may, via a user interface of application provider 102, instruct, command, or otherwise cause application provider 102 to upload an application. In some embodiments, such user may use a web browser executing on application provider 102 and interfaced to a web server executing on resource provider 106 in order to cause such upload. In the same or alternative embodiments, such upload may be triggered automatically in response to an event (e.g., an update or new version of the application becomes available, and application provider automatically uploads in response to a determination that the new update has occurred). In addition, in these and other embodiments, application provider 102 may also, in connection with the upload of an application, upload information regarding such application. Such information may include a cost to a data provider 104 of executing the application, a description of the application including an input/output data format for the application (if necessary), and any other suitable information.

At step 204, after upload of the application to resource provider 106, resource provider 106 may generate a unique application identifier (ID) associated with the uploaded application and communicate such unique application ID to application provider 102.

At step 206, a user of data provider 104 may, via a remote user interface of resource provider 106 accessible at data provider 106, determine one or more desired applications stored on resource provider 106 to be executed upon data of data provider 104. In some embodiments, the names of various applications stored on resource provider 106, the unique application IDs of such applications, and information regarding such applications (e.g., the information uploaded in connection with an application in step 202) may be provided to the user via a remote user interface of resource provider 106 accessible at data provider 104 (e.g., via a web browser), and a user may base the determination of which application(s) to use based on his or her review of such information.

At step 208, data provider 104 may upload data to resource provider 106 including policies related to such data. Such upload may be initiated in response to an instruction, command, or another action of a user of data provider 104 indicating the user's desire to perform such upload. The policies related to the updated data may include the application(s) permitted to access the data (which a user may specify by providing the unique application IDs of such authorized applications), the length of time the data will remain valid and/or stored at resource provider 106, persons and/or computing devices authorized to access data output of the executed application(s), and/or any other suitable parameters.

At step 210, in response to the receipt of data uploaded from data provider 104 to resource provider 106, resource provider 106 may generate a unique data ID associated with the data and communicate such unique data ID to data provider 104.

At step 212, data provider 104 may initiate execution of an application upon data uploaded to resource provider 106 by communicating the unique application ID and the unique data ID associated with the desired application and data to resource provider 106. Such uploading may be performed manually and/or automatically. For example, a user of data provider 104 may, via a user interface of data provider 104, instruct, command, or otherwise cause data provider 104 to communicate a unique application ID and a unique data ID to resource provider 106.

At step 214, in response to receipt of a unique application ID and unique data ID from data provider 104, resource provider 106 may execute the application associated with the unique application ID and apply the data associated with the unique data ID to the application. Resource provider 106 may also generate an execution reference ID and communicate such execution reference ID to data provider 104. Using the execution reference ID, data provider 104 may poll resource provider 106 to determine an execution status of an application upon the data (e.g., executing, error, completed, etc.).

At step 216, upon completion of application execution, resource provider 106 may communicate an execution report to data provider 104, including an output data ID, to data provider 104. The execution report may include information regarding the execution of the application other than the output data ID, including execution time, cost of running the application, etc.

At step 218, resource provider 106 may communicate an execution report to application provider 102. The execution report may include information regarding the execution of the application, including execution time, cost of running the application, etc. This execution report may be similar to the execution report communicated to data provider 104 in step 216, with the exception that data-provider specific information is not included.

At step 220, data provider 104 may request download of the output data produced during execution of the application by communicating the output data ID to resource provider 106.

At step 222, in response to receipt of the output data ID, resource provider 106 may communicate the output data to data provider 104.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software and/or firmware embodied in a memory or other computer-readable media.

In addition to the functionality described above, the various components of system 100 may have other functionality. For example, to provide further protection for data and applications, application provider 102 and/or data provider 104 may be configured to destroy or delete applications and/or data, as appropriate, that are uploaded to resource provider 106. As a specific example, data provider 104 may be configured to delete data uploaded to resource provider 106 by communicating an explicit request to resource provider 106 or by defining a policy (e.g., in connection with the policy uploaded at step 208 of FIG. 2) that the data is deleted after a certain amount of time or after a certain number of application executions (e.g., after one week or after the data is applied to one application execution). Similarly, application provider 102 may also delete an application uploaded to resource provider 10 or by defining a policy.

As another example, resource provider 106 may provide logging with respect to applications and data uploaded to it. As a specific example, resource provider 106 may store a data log with respect to data uploaded to it, wherein such data log may include when the data was uploaded, when the data is applied to an application, which application(s) are applied to the data, when the data was deleted, etc. Such data log may be retrieved from resource provider 106 by data provider 104. Similarly, resource provider 106 may store an application log with respect to an application uploaded to it, wherein such application log may include when the application was uploaded, when the application was executed, which data is applied to the application, when the application was deleted, etc. Such data log may be retrieved from resource provider 106 by data provider 104.

In some embodiments of the present disclosure, a user at data provider 104 may upload data to resource provider 106, but not specify an application to be associated with the data. Instead, the data may be uploaded with a description, wherein such description may include information regarding the desired operation to be undertaken or problem to be solved with respect to the data, the cost the user of the data provider 104 is willing to pay to have the operation undertaken or problem solved, and/or other suitable information. A user of application provider 102 may review such descriptions for data uploaded to resource provider 106 and may then upload an application that is capable to execute the operation or solve the problem. If the operation is successful or the problem is solved, the user of application provider 102 may be compensated for the execution of the application.

In these and other embodiments, resource provider 106 may allow a use of a data provider 104 to select among a plurality of execution plans. The execution plans may each include a quantity of resources to be dedicated to execution of an application and a cost associated with executing an application according to such execution plan. Given that an application may execute faster if more resources are dedicated to the application, selection of a particular execution plan may allow a user at data provider 104 to select an efficiency/cost combination suitable to the user. Data provider 104 may communicate selection of such an execution plan via a policy uploaded in connection with an upload of data.

A component of system 100 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to system 100 without departing from the scope of the invention. The components of system 100 may be integrated or separated. Moreover, the operations of system 100 may be performed by more, fewer, or other components. Additionally, operations of system 100 may be performed using any suitable logic. As used in this document, "each" refers to each member of a set or each member of a subset of a set.

Certain embodiments of the invention may provide one or more technical advantages. A technical advantage may be that data may be applied to an application with a reduction or elimination of risks that: (i) the application provider may abuse or misuse the applied data; and/or (ii) the data provider may abuse or misuse the application, as compared to such risks present in traditional approaches.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method for securely providing services to a data provider and an application provider at a resource provider, comprising:
   receiving an application from an application provider at the resource provider;
   receiving data from a data provider at the resource provider;
   receiving a first request at the resource provider from the data provider to execute the application and apply the data as input to the application;
   executing the application at the resource provider in response to receiving the first request;
   storing output data resulting from execution of the application at the resource provider;
   receiving a second request at the resource provider from the data provider to transmit the output data to the data provider; and
   communicating the output data from the resource provider to the data provider in response to the second request.

2. A method according to claim 1, further comprising:
   generating a unique application identifier in response to receiving the application from the application provider; and
   generating a unique data identifier in response to receiving the application from the application provider;
   wherein receiving the first request from the data provider comprises receiving from the data provider the unique application identifier and the unique data identifier.

3. A method according to claim 1, further comprising:
   generating an execution reference identifier in connection with execution of the application;
   communicating the execution reference identifier to the data provider; and
   communicating an execution status for the application to the data provider in response to receiving the execution reference identifier from the data provider.

4. A method according to claim 1, further comprising:
communicating an output data identifier to the data provider in response to completion of execution of the application; and
wherein receiving a second request from the data provider comprises receiving the output data identifier from the data provider.

5. A method according to claim 1, further comprising communicating an execution report to the data provider in response to completion of execution of the application.

6. A method according to claim 5, wherein the execution report includes at least one of execution time of the application and cost of execution of the application.

7. A method according to claim 1, further comprising receiving from the data provider an indication of the quantity of resources of the resource provider to be used to execute the application.

8. A method according to claim 1, further comprising receiving from the data provider a policy for the data, the policy indicating one or more of the following: one or more applications permitted to access the data, a length of time the data will remain valid at the resource provider, and a length of time the data will be stored at the resource provider.

9. A non-transitory computer-readable medium comprising logic for securely providing services to a data provider and an application provider at a resource provider, the logic configured for, when executed by a processor:
receiving an application from an application provider at the resource provider;
receiving data from a data provider at the resource provider;
receiving a first request at the resource provider from the data provider to execute the application and apply the data as input to the application;
executing the application at the resource provider in response to receiving the first request;
storing output data resulting from execution of the application at the resource provider;
receiving a second request at the resource provider from the data provider to transmit the output data to the data provider; and
communicating the output data from the resource provider to the data provider in response to the second request.

10. A system according to claim 9, the logic further configured for, when executed by a processor:
generating a unique application identifier in response to receiving the application from the application provider; and
generating a unique data identifier in response to receiving the application from the application provider;
wherein receiving the first request from the data provider comprises receiving from the data provider the unique application identifier and the unique data identifier.

11. A system according to claim 9, the logic further configured for, when executed by a processor:
generating an execution reference identifier in connection with execution of the application;
communicating the execution reference identifier to the data provider; and
communicating an execution status for the application to the data provider in response to receiving the execution reference identifier from the data provider.

12. A system according to claim 9, the logic further configured for, when executed by a processor:
communicating an output data identifier to the data provider in response to completion of execution of the application; and
wherein receiving a second request from the data provider comprises receiving the output data identifier from the data provider.

13. A system according to claim 9, the logic further configured for, when executed by a processor, communicating an execution report to the data provider in response to completion of execution of the application.

14. A system according to claim 13, wherein the execution report includes at least one of execution time of the application and cost of execution of the application.

15. A system according to claim 9, the logic further configured for, when executed by a processor, receiving from the data provider an indication of the quantity of resources of the resource provider to be used to execute the application.

16. A system according to claim 9, further comprising logic for receiving from the data provider a policy for the data, the policy indicating one or more of the following: one or more applications permitted to access the data, a length of time the data will remain valid at the resource provider, and a length of time the data will be stored at the resource provider.

17. A method for securely providing services to a data provider and an application provider at a resource provider, comprising:
receiving data and a description from a data provider at the resource provider, the description including information regarding a desired operation to be applied to the data and a cost a user of the data provider is willing to pay to have the desired operation executed;
receiving an application from an application provider at the resource provider, the application uploaded in response to receiving the data and the description and configured to perform the desired operation; and
executing the application at the resource provider in response to receiving the application.

* * * * *